United States Patent
Hana et al.

(10) Patent No.: US 12,253,118 B2
(45) Date of Patent: Mar. 18, 2025

(54) HYDRAULIC CLUTCH AND WORK-VEHICLE TRAVEL POWER TRANSMISSION APPARATUS INCLUDING THE HYDRAULIC CLUTCH

(71) Applicant: KUBOTA CORPORATION, Osaka (JP)

(72) Inventors: Hidetoshi Hana, Sakai (JP); Atsushi Jinnai, Sakai (JP); Tomonari Tsuchida, Sakai (JP); Ryoma Iwase, Sakai (JP); Yosui Nishijima, Sakai (JP); Naoyuki Miyamoto, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/537,175

(22) Filed: Dec. 12, 2023

(65) Prior Publication Data
US 2024/0200614 A1    Jun. 20, 2024

(30) Foreign Application Priority Data
Dec. 16, 2022 (JP) .................................. 2022-201429

(51) Int. Cl.
*F16D 25/12* (2006.01)
*F16D 21/06* (2006.01)
(Continued)

(52) U.S. Cl.
CPC ....... F16D 25/123 (2013.01); F16D 25/0638 (2013.01); F16D 25/10 (2013.01);
(Continued)

(58) Field of Classification Search
CPC .... F16D 25/123; F16D 25/0638; F16D 25/10; F16D 13/648; F16D 13/72; F16D 13/74;
(Continued)

(56) References Cited

U.S. PATENT DOCUMENTS 3,202,253 A * 8/1965 Merritt et al. ........ F16D 25/123
192/113.36
7,690,492 B2 * 4/2010 Gooden et al. ....... F16D 25/123
192/113.32
(Continued)

FOREIGN PATENT DOCUMENTS

EP          2363612 A1    9/2011
JP       H02120517 A    5/1990
(Continued)

OTHER PUBLICATIONS

Official Communication issued in corresponding European Patent Application No. 23215578.8, mailed on Apr. 22, 2024, 7 pages.

*Primary Examiner* — Richard M Lorence
(74) *Attorney, Agent, or Firm* — Keating & Bennett, LLP

(57) ABSTRACT

A clutch hub includes oil supply holes extending therethrough to supply lubricating oil from an interior of the clutch hub toward first clutch plates and second clutch plates. An injection port to allow injection of the lubricating oil into the interior of the clutch hub is located inside of the clutch hub between the clutch hub and a rotation axis of a clutch body. The clutch hub includes an inner circumferential portion including an opposing portion opposing the injection port, and a first portion closer to a first end portion of the clutch hub than the opposing portion in a direction extending along the rotation axis. The first portion includes an inclined inner circumferential surface structured such that a radius of the clutch hub decreases toward the first end portion.

8 Claims, 6 Drawing Sheets

(51) Int. Cl.
  *F16D 25/0638* (2006.01)
  *F16D 25/10* (2006.01)
(52) U.S. Cl.
  CPC ............... *F16D 2021/0607* (2013.01); *F16D 2021/0661* (2013.01)
(58) Field of Classification Search
  CPC ......... F16D 21/0661; F16D 2021/0661; F16D 2021/0607
  See application file for complete search history.

(56) References Cited

U.S. PATENT DOCUMENTS

| | | |
|---|---|---|
| 2005/0029072 A1 | 2/2005 | Kitabayashi |
| 2006/0113157 A1 | 6/2006 | Ichikawa et al. |
| 2009/0194384 A1 | 8/2009 | Tsukuda et al. |
| 2021/0094416 A1* | 4/2021 | Tsuchida et al. ... F16H 57/0494 |

FOREIGN PATENT DOCUMENTS

| | | | |
|---|---|---|---|
| JP | 3-65027 U | | 6/1991 |
| JP | 5-231446 A | * | 9/1993 |

* cited by examiner

HYDRAULIC CLUTCH AND WORK-VEHICLE TRAVEL POWER TRANSMISSION APPARATUS INCLUDING THE HYDRAULIC CLUTCH

CROSS REFERENCE TO RELATED APPLICATIONS

This application claims the benefit of priority to Japanese Patent Application No. 2022-201429 filed on Dec. 16, 2022. The entire contents of this application are hereby incorporated herein by reference.

BACKGROUND OF THE INVENTION

1. Field of the Invention

The present invention relates to hydraulic clutches and work-vehicle travel power transmission apparatuses including the hydraulic clutches.

2. Description of the Related Art

As described in JP 3-65027U, a hydraulic clutch includes a clutch body; a tubular clutch hub (clutch plate attachment part) located inside a tubular clutch plate support section included in the clutch body; a plurality of first clutch plates (clutch plates) configured to be locked to the clutch plate support section and arranged in a direction extending along a rotation axis of the clutch body; and a plurality of second clutch plates (clutch plates) configured to be locked to the clutch hub and arranged in the direction extending along the rotation axis. This hydraulic clutch includes oil supply holes (through holes) formed in the clutch hub and configured to feed lubricating oil to the first clutch plates and the second clutch plates.

In this type of hydraulic clutch, the lubricating oil supplied to the interior of the clutch hub is thrown against an inner circumferential portion of the clutch hub by a centrifugal force generated by rotation of the clutch hub or the clutch body. On the inner circumferential portion of the clutch hub, the thrown lubricating oil flows toward end portions of the clutch hub in a direction extending along the rotation axis of the clutch body. The more likely the lubricating oil thrown against the inner circumferential portion is to flow toward end portions of the clutch hub in the direction extending along the rotation axis, the less likely the lubricating oil is to flow into the oil supply holes of the clutch hub. Accordingly, the lubricating oil is unlikely to reach the first clutch plates and the second clutch plates. That is, the first clutch plates and the second clutch plates cannot be efficiently cooled.

SUMMARY OF THE INVENTION

Example embodiments of the present invention provide hydraulic clutches that each includes oil supply holes extending through a clutch hub to efficiently cool first clutch plates and second clutch plates, and work-vehicle travel power transmission apparatuses that can each switch between forward travel and rearward travel while efficiently cooling the first clutch plates and the second clutch plates.

A hydraulic clutch according to an aspect of an example embodiment of the present invention includes a clutch body, a tubular clutch hub located inside a tubular clutch plate support section included in the clutch body, a plurality of first clutch plates to be locked to the clutch plate support section and arranged in a direction extending along a rotation axis of the clutch body, a plurality of second clutch plates to be locked to the clutch hub and arranged in the direction extending along the rotation axis, oil supply holes extending through the clutch hub to supply lubricating oil from an interior of the clutch hub toward the first clutch plates and the second clutch plates, and an injection port to allow injection of the lubricating oil into the interior of the clutch hub, wherein the injection port is located in the interior of the clutch hub at a location between the clutch hub and the rotation axis, and the clutch hub includes an inner circumferential portion including an opposing portion opposing the injection port, and a first portion closer to a first end portion of the clutch hub than the opposing portion in the direction extending along the rotation axis, the first portion including an inclined inner circumferential surface structured such that a radius of the clutch hub decreases toward the first end portion.

With this configuration, the lubricating oil is injected into the interior of the clutch hub from the injection port located in the interior of the clutch hub at an intermediate portion between the clutch hub and the rotation axis. Accordingly, the lubricating oil is appropriately supplied to the interior of the clutch hub. The lubricating oil supplied to the interior of the clutch hub is thrown against the inner circumferential portion of the clutch hub by a centrifugal force generated by rotation of the clutch hub and the clutch body. The lubricating oil thrown against the inner circumferential portion tends to flow toward end portions of the inner circumferential portion on the inner circumferential portion. However, since the first portion of the inner circumferential portion is an inclined inner circumferential surface, the amount of centrifugal force acting on the lubricating oil decreases toward the first end portion of the inner circumferential portion at the first portion, thus suppressing the momentum of flow of the lubricating oil toward the first end portion of the inner circumferential portion. This allows the lubricating oil thrown against the inner circumferential portion to easily flow into the oil supply holes. Since the lubricating oil that has been appropriately supplied to the interior of the clutch hub can easily flow into the oil supply holes, and the lubricating oil can easily flow into the oil supply holes, a large amount of lubricating oil can be supplied from the oil supply holes to the first clutch plates and the second clutch plates, thus making it possible to efficiently cool the first clutch plates and the second clutch plates.

According to another aspect of an example embodiment of the present invention, it is preferable that the opposing portion includes a parallel inner circumferential surface that is parallel or substantially parallel to the rotation axis.

With this configuration, since the opposing portion includes a parallel inner circumferential surface, the momentum of flow of the lubricating oil thrown against the opposing portion to the first portion is suppressed as compared with a case where the opposing portion is an inclined inner circumferential surface extending from the inclined inner circumferential surface of the first portion. This allows the lubricating oil thrown against the inner circumferential portion of the clutch hub to easily flow into the oil supply holes, thus making it possible to supply a large amount of the lubricating oil to the first clutch plates and the second clutch plates.

According to another aspect of an example embodiment of the present invention, it is preferable that the injection port is located in the interior of the clutch hub at a location opposing a portion between opposite end portions of the clutch hub in the direction extending along the rotation axis, and the inner circumferential portion of the clutch hub further includes a second portion closer to a second end portion of the clutch hub than the opposing portion in the direction extending along the rotation axis, the second portion including an inclined inner circumferential surface structured such that the radius of the clutch hub decreases toward the second end portion.

With this configuration, the lubricating oil thrown against the inner circumferential portion of the clutch hub flows separately to the first portion in the direction extending along the rotation axis and the second portion in the direction extending along the rotation axis at the inner circumferential portion. Even when the lubricating oil flows toward the first end portion of the inner circumferential portion in the direction extending along the rotation axis at the first portion of the inner circumferential portion in the direction extending along the rotation axis, and the lubricating oil flows toward the second end portion of the inner circumferential portion in the direction extending along the rotation axis at the second portion of the inner circumferential portion in the direction extending along the rotation axis, the momentum of flow of the lubricating oil at the first portion and the second portion toward end portions of the inner circumferential portion in the direction extending along the rotation axis is suppressed by the inclined inner circumferential surfaces of the first portion and the second portion. This allows the lubricating oil to easily flow into the oil supply holes, thus making it possible to supply a large amount of lubricating oil to the first clutch plates and the second clutch plates.

According to another aspect of an example embodiment of the present invention, it is preferable that the clutch plate support section includes an oil discharge hole extending therethrough to discharge the lubricating oil from an interior to an exterior of the clutch body.

With this configuration, the lubricating oil that has cooled the first clutch plates and the second clutch plates can be discharged out of the clutch body from the oil discharge hole. Accordingly, the first clutch plates and the second clutch plates can be cooled with fresh lubricating oil. This makes it possible to efficiently cool the first clutch plates and the second clutch plates.

According to another aspect of an example embodiment of the present invention, it is preferable that the oil supply holes are arranged with intervals therebetween in a circumferential direction of the clutch hub respectively at a plurality of locations of the clutch hub in the direction extending along the rotation axis.

With this configuration, the lubricating oil is supplied to the first clutch plates and the second clutch plates from the oil supply holes located at a plurality of locations. Accordingly, the lubricating oil can be supplied over a wide range of portions at which the first clutch plates and the second clutch plates are located in the direction extending along the rotation axis, thus making it possible to efficiently cool the first clutch plates and the second clutch plates.

According to another aspect of an example embodiment of the present invention, it is preferable that the oil supply hole at one of two adjacent locations and the oil supply hole at another one of the two adjacent locations are displaced from each other in the circumferential direction of the clutch hub.

With this configuration, portions of the first clutch plates and the second clutch plates to which the lubricating oil is supplied from an oil supply hole located at one of adjacent locations are different from portions of the first clutch plates and the second clutch plates to which the lubricating oil is supplied from an oil supply hole located at the other of the adjacent locations in the circumferential direction of the first clutch plates and the second clutch plates. Accordingly, considering the number of oil supply holes arranged in the circumferential direction of the clutch hub respectively at a plurality of locations of the clutch hub, the lubricating oil can be supplied over a wide range in the circumferential direction of the first clutch plates and the second clutch plates, thus making it possible to efficiently cool the first clutch plates and the second clutch plates.

According to another aspect of an example embodiment of the present invention, it is preferable that the clutch body includes, in the interior thereof, a clutch piston to press and release the first clutch plates and the second clutch plates, a return spring to return the clutch piston to a release position, and a stopper to receive and support the return spring, the stopper includes an inserted portion inserted into the interior of the clutch hub, and the injection port extends through the inserted portion.

With this configuration, in order to provide an injection port at a location corresponding to a portion between opposite end portions of the clutch hub in the direction extending along the rotation axis, the stopper can define a portion of the injection port.

A work-vehicle travel power transmission apparatus according to another aspect of an example embodiment of the present invention includes a forward/rearward travel switch including two of the hydraulic clutches according to an example embodiment of the present invention described above, and a transmission to shift power supplied from a power source and output the power to the forward/rearward travel switch, wherein, in response to one of the two hydraulic clutches being engaged, the forward/rearward travel switch is operable to convert power supplied from the transmission into forward travel power and output the forward travel power toward a travel device, and, in response to the other of the two hydraulic clutches being engaged, convert power supplied from the transmission into rearward travel power and output the rearward travel power toward the travel device.

With this configuration, one hydraulic clutch converts power that is input from the transmission into forward travel power while rotating at high speed, and anther hydraulic clutch converts power that is input from the transmission into rearward travel power while rotating at high speed. However, a large amount of lubricating oil can be supplied to the first clutch plates and the second clutch plates of the one hydraulic clutch and the other hydraulic clutch. Accordingly, it is possible to perform switching between forward travel and rearward travel while efficiently cooling the first clutch plates and the second clutch plates of the one hydraulic clutch and the other hydraulic clutch.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Hereinafter, example embodiments of the present invention will be described with reference to the drawings.

Figure 1:
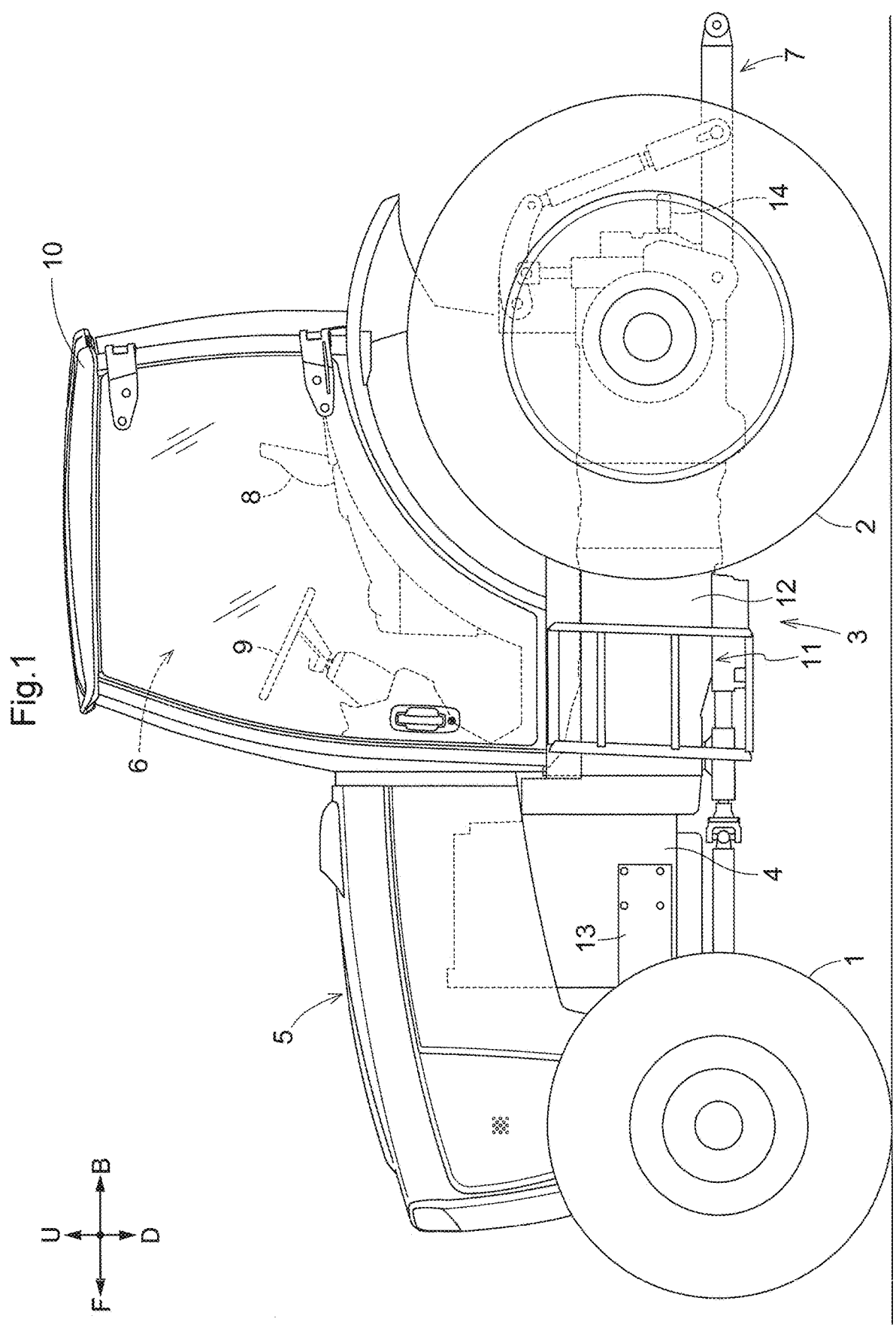
FIG. 1 is a side view of a tractor.

Note that, in the following description, regarding the traveling body of a tractor (an example of a "work vehicle"), the direction indicated by the arrow F shown in FIG. 1 is the "forward direction" of the body, the direction indicated by the arrow B is the "rearward direction" of the body, the direction indicated by the arrow U is the "upward direction" of the body, the direction indicated by the arrow D is the "downward direction" of the body, the direction toward the front side of the sheet in FIG. 1 is the "leftward direction" of the body, and the direction toward the back side of the sheet in FIG. 1 is the "rightward direction" of the body.

FIG. 1 shows a tractor. The tractor includes a traveling body 3 supported by a pair of steerable and drivable left and right front wheels 1 (travel device), and a pair of drivable left and right rear wheels 2 (travel device). A motive section 5 including an engine 4 is provided at a front portion of the traveling body 3. A driving section 6 in which an operator rides to perform driving operations is provided at a rear portion of the traveling body 3. In addition, a link mechanism 7 configured to couple, in a vertically movable manner, a work device such as a rotary cultivator device is provided at a rear portion of the traveling body 3. The driving section 6 includes a driver's seat 8, a steering wheel 9 to steer the front wheels 1, and a cabin 10 covering a boarding space. A body frame 11 of the traveling body 3 includes the engine 4, a transmission case 12 whose front portion is coupled to a rear portion of the engine 4, a front wheel support frame 13 coupled to a lower portion of the engine 4, and so forth. A power take-off shaft 14 configured to output power supplied from the engine 4 and transmit the power to the work device is provided at a rear portion of the transmission case 12.

Figure 2:
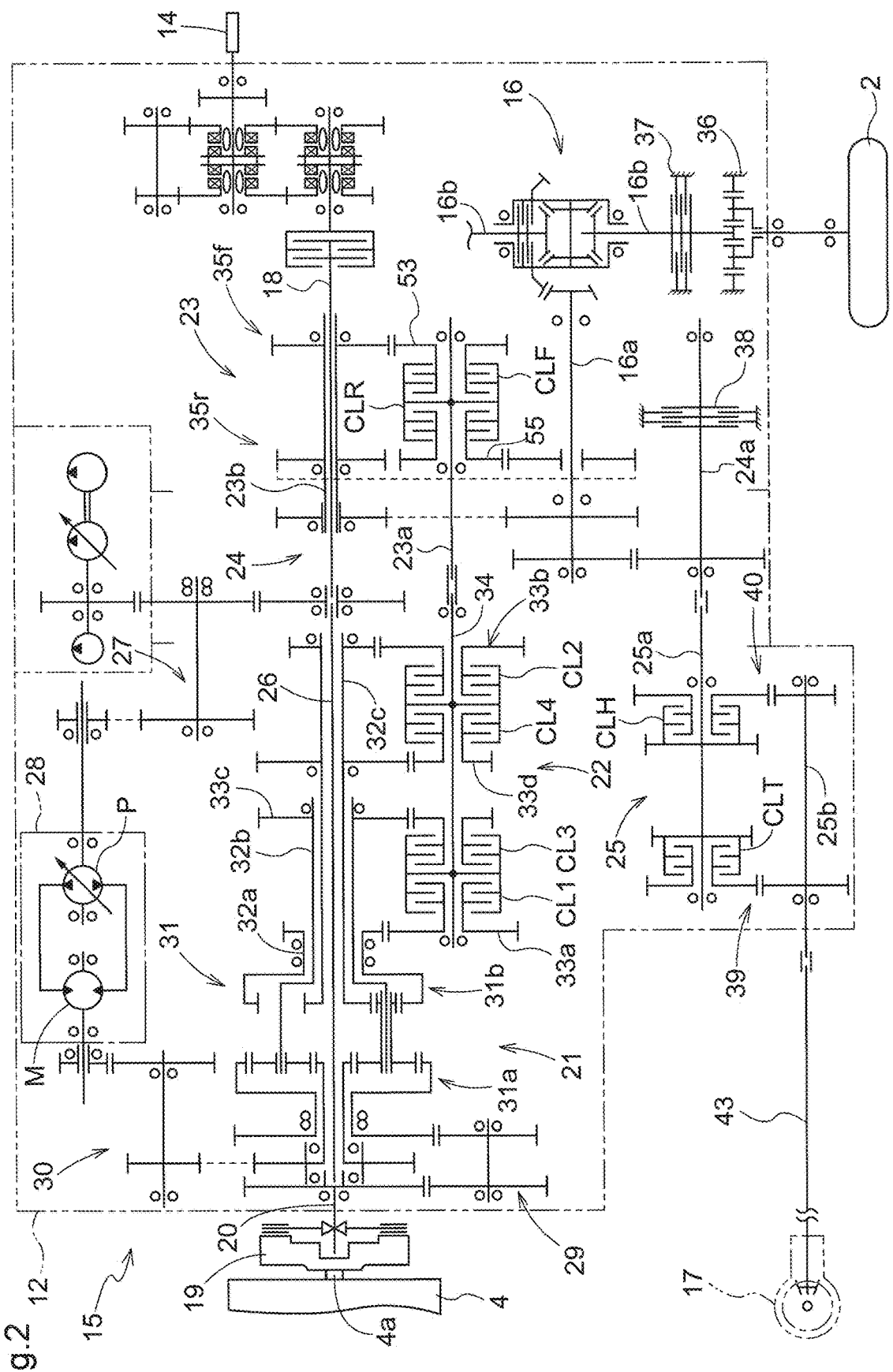
FIG. 2 is a schematic diagram of a travel power transmission apparatus.

As shown in FIG. 2, a travel power transmission apparatus 15 configured to transmit power supplied from the engine 4 to the front wheels 1 and the rear wheels 2 includes a transmission 21 including, for example, an input shaft 20 provided at a front portion of the transmission case 12, a forward/rearward travel switch 23 located rearward of the transmission 21, a rear-wheel differential mechanism 16 located rearward of the forward/rearward travel switch 23, and a front-wheel power transmission 25 housed in a lower portion of the transmission case 12.

As shown in FIG. 2, power of an output shaft 4a of the engine 4 is transmitted to the input shaft 20 via a main clutch 19. The transmission 21 includes a continuously variable transmission 28 to which power of the input shaft 20 is input via a rotation shaft 26 and a gear interlocking mechanism 27, a planetary transmission device 31 to which output of the continuously variable transmission 28 is input via a gear interlocking mechanism 30, and power of the input shaft 20 is input via a gear interlocking mechanism 29, and a staged power transmission 22 to which output of the planetary transmission device 31 is input.

As shown in FIG. 2, the continuously variable transmission 28 includes a variable capacity hydraulic pump P to which power of the input shaft 20 is input via the rotation shaft 26 and the gear interlocking mechanism 27, and a hydraulic motor M configured to be driven by pressurized oil supplied from the hydraulic pump P. In response to a swash plate angle of the hydraulic pump P being changed, the power from the input shaft 20 is shifted between forward power and reverse power, then the rotation speed of the forward power and the reverse power is changed in a continuously variable manner, and the forward power and the reverse power are output from the hydraulic pump P. The continuously variable transmission 28 may be a hydrostatic continuously variable transmission.

As shown in FIG. 2, the planetary transmission device 31 includes a first planetary transmission 31a, and a second planetary transmission 31b interlocked with the first planetary transmission 31a. The interlocking between the first planetary transmission 31a and the second planetary transmission 31b is achieved by interlocking a planetary gear of the first planetary transmission 31a with a planetary gear of the second planetary transmission 31b. The planetary transmission device 31 may be a combined planetary transmission device. Output from the continuously variable transmission 28 is input to a sun gear of the first planetary transmission 31a via the gear interlocking mechanism 30, and power of the input shaft 20 is input to a ring gear of the first planetary transmission 31a via the gear interlocking mechanism 29. A first output shaft 32a, a second output shaft 32b, and a third output shaft 32c extend rearward from the second planetary transmission 31b.

In the planetary transmission device 31, the first planetary transmission 31a and the second planetary transmission 31b combine power that is input from the engine 4 to the first planetary transmission 31a via the input shaft 20 and the gear interlocking mechanism 29, and power that is input from the continuously variable transmission 28 to the first planetary transmission 31a via the gear interlocking mechanism 30, and the combined power is output from the first output shaft 32a, the second output shaft 32b, and the third output shaft 32c. In the planetary transmission device 31, in response to the continuously variable transmission 28 being operated to perform shifting, combined power with a rotation speed corresponding to the shifting state of the continuously variable transmission 28 is output.

As shown in FIG. 2, the staged power transmission 22 includes an output shaft 34 located parallel to the first output shaft 32a, the second output shaft 32b, and the third output shaft 32c of the planetary transmission device 31. The output shaft 34 is provided with a first clutch CL1, a second clutch CL2, a third clutch CL3, and a fourth clutch CL4. The first clutch CL1 and the first output shaft 32a are coupled to each other by a first gear interlocking mechanism 33a. The second clutch CL2 and the third output shaft 32c are coupled to each other by a second gear interlocking mechanism 33b. The third clutch CL3 and the second output shaft 32b are coupled to each other by a third gear interlocking mechanism 33c. The fourth clutch CL4 and the third output shaft 32c are coupled to each other by a fourth gear interlocking mechanism 33d.

In the staged power transmission 22, in response to the first clutch CL1 being engaged, the continuously variable combined power output from the first output shaft 32a of the planetary transmission device 31 is output from the output shaft 34 as power that is shifted in a continuously variable manner in the first range. In response to the second clutch CL2 being engaged, the continuously variable combined power output from the third output shaft 32c of the planetary transmission device 31 is output from the output shaft 34 as power that is shifted in a continuously variable manner in a second range higher than the first range. In response to the third clutch CL3 being engaged, the continuously variable combined power output from the second output shaft 32b of the planetary transmission device 31 is output from the output shaft 34 as power that is shifted in a continuously variable manner in a third range higher than the second range. In response to the fourth clutch CL4 being engaged, the continuously variable combined power output from the third output shaft 32c of the planetary transmission device 31 is output from the output shaft 34 as power that is shifted in a continuously variable manner in a fourth range that is higher than the third range.

As shown in FIG. 2, the forward/rearward travel switch 23 includes an input shaft 23a coupled to the output shaft 34 of the staged power transmission 22, and an output shaft 23b located parallel to the input shaft 23a. The output shaft 23b may be a tubular shaft, and may be externally fitted to a rotation shaft 18 configured to transmit power of the rotation shaft 26 to the power take-off shaft 14. The input shaft 23a is provided with a forward travel clutch CLF and a rearward travel clutch CLR. A forward-travel gear interlocking mechanism 35f spans the forward travel clutch CLF and the output shaft 23b. A rearward-travel gear interlocking mechanism 35r spans the rearward travel clutch CLR and the output shaft 23b.

In the forward/rearward travel switch 23, power of the output shaft 34 of the staged power transmission 22 is transmitted to the input shaft 23a. In response to the forward travel clutch CLF being engaged, power of the input shaft 23a is converted into forward travel power by the forward travel clutch CLF and the forward-travel gear interlocking mechanism 35f, and the forward travel power is output from the output shaft 23b. In response to the rearward travel clutch CLR being engaged, power of the input shaft 23a is converted into rearward travel power by the rearward travel clutch CLR and the rearward-travel gear interlocking mechanism 35r, and the rearward travel power is output from the output shaft 23b.

As shown in FIG. 2, the rear-wheel differential mechanism 16 includes an input shaft 16a to which forward travel power and rearward travel power of the output shaft 23b of the forward/rearward travel switch 23 is transmitted via a gear interlocking mechanism 24, and power of the input shaft 16a is transmitted from left and right output shafts 16b to the left and right rear wheels 2. The power of the left output shaft 16b is transmitted to the left rear wheel 2 via a planetary speed reduction mechanism 36. The left output shaft 16b is provided with a steering brake 37. Although not shown, the system to transmit power from the right output shaft 16b to the right rear wheel 2 includes the same planetary speed reduction mechanism and steering brake as the planetary speed reduction mechanism 36 and the steering brake 37 included in the system for transmitting power to the left rear wheel 2.

As shown in FIG. 2, the front-wheel power transmission 25 includes an input shaft 25a to which forward travel power and rearward travel power of the output shaft 23b of the forward/rearward travel switch 23 is transmitted via the gear interlocking mechanism 24, and an output shaft 25b located parallel to the input shaft 25a. The input shaft 25a is provided with a constant speed clutch CLT and a speed increasing clutch CLH. A constant-speed gear interlocking mechanism 39 spans the constant speed clutch CLT and the output shaft 25b. A speed-increasing gear interlocking mechanism 40 spans the speed increasing clutch CLH and the output shaft 25b. A power transmission shaft 24a included in the gear interlocking mechanism 24 is provided with a parking brake 38.

In the front-wheel power transmission 25, in response to the constant speed clutch CLT being engaged, power of the input shaft 25a is transmitted to the output shaft 25b by the constant speed clutch CLT and the constant-speed gear interlocking mechanism 39. In addition, power of the front wheels 1 that causes a peripheral velocity equal to the peripheral velocity of the rear wheels 2 is output from the output shaft 25b. In response to the speed increasing clutch CLH being operated to be engaged, power of the input shaft 25a is transmitted to the output shaft 25b by the speed increasing clutch CLH and the speed-increasing gear interlocking mechanism 40. In addition, power of the front wheels 1 that causes a peripheral velocity greater than the peripheral velocity of the rear wheel 2 is output from the output shaft 25b. The power output from the output shaft 25b is transmitted to a front-wheel differential mechanism 17 via a rotation shaft 43.

Figure 3:
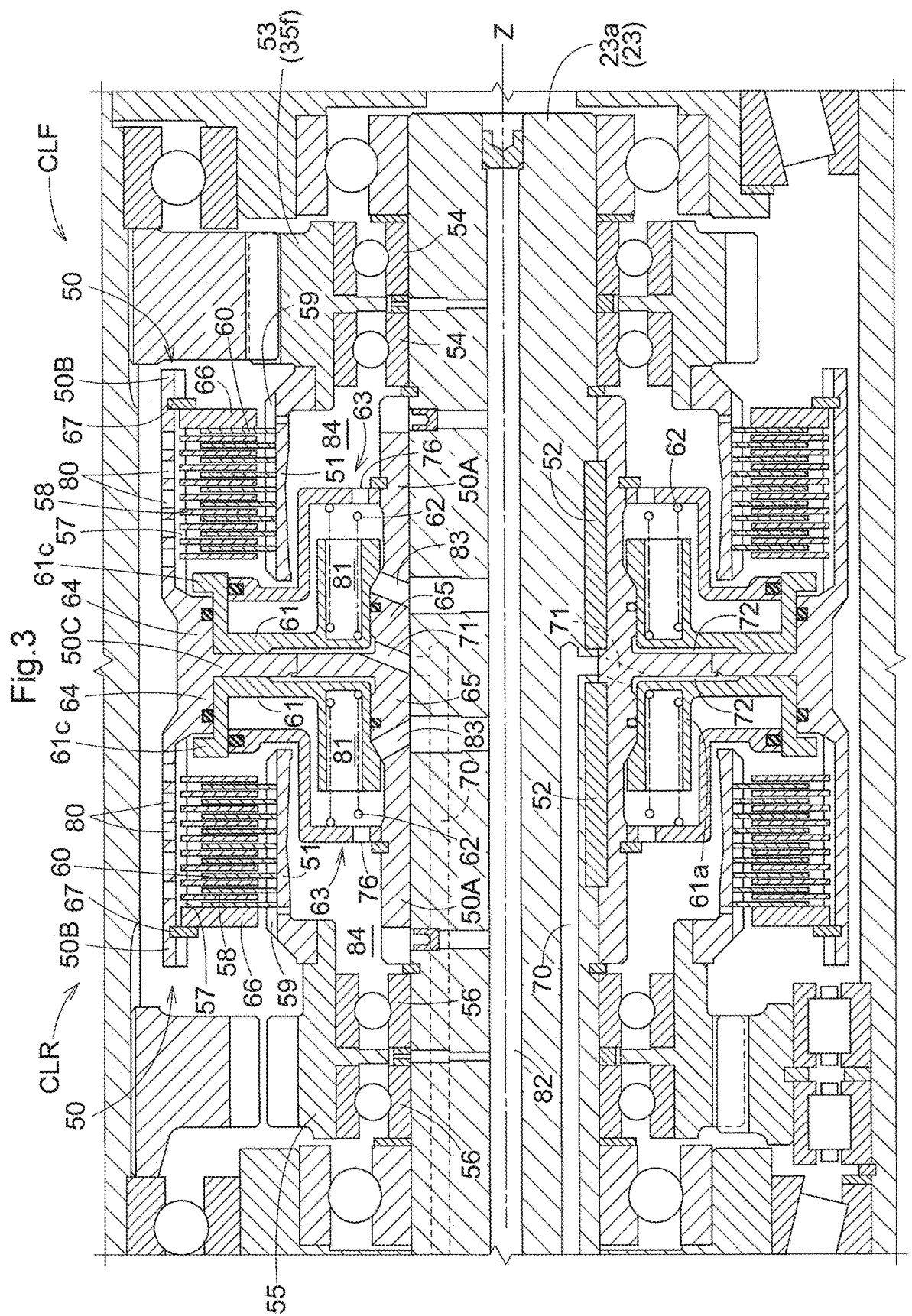
FIG. 3 is a cross-sectional view of a forward travel clutch and a rearward travel clutch.
Figure 4:
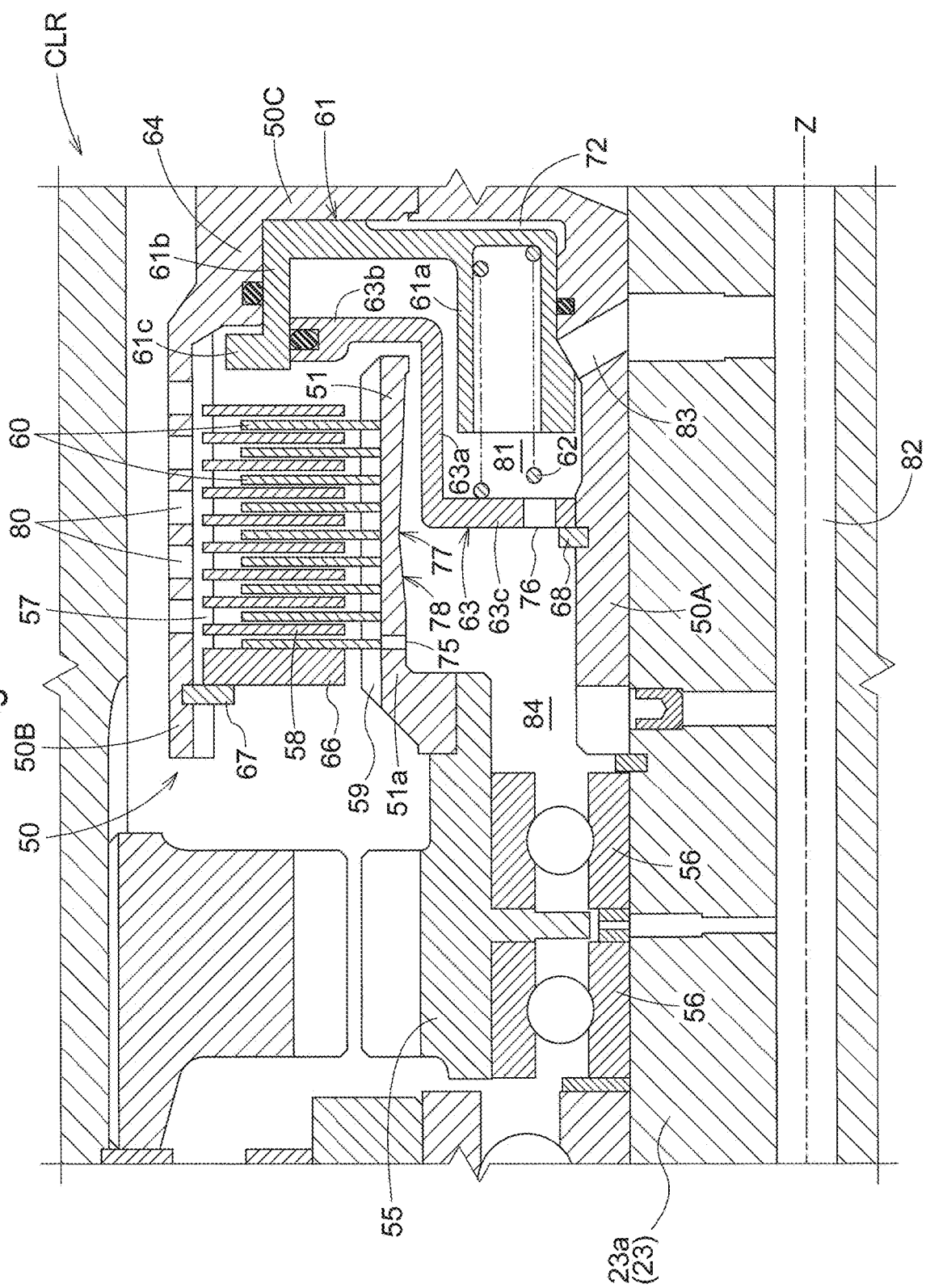
FIG. 4 is a cross-sectional view of the rearward travel clutch.

As shown in FIGS. 3 and 4, the forward travel clutch CLF and the rearward travel clutch CLR each may be a hydraulic clutch. The forward travel clutch CLF and the rearward travel clutch CLR each include a clutch body 50 and a clutch hub 51.

Each clutch body 50 includes a boss portion 50A located at a central portion of the clutch body 50, a tubular clutch plate support section 50B located at an outer circumferential portion of the clutch body 50, and a coupling portion 50C configured to couple the clutch plate support section 50B and the boss portion 50A to each other at a first end portion of the clutch body 50 in a direction extending along a rotation axis Z of the clutch body 50. The coupling portion 50C of the clutch body 50 of the forward travel clutch CLF and the coupling portion 50C of the clutch body 50 of the rearward travel clutch CLR may be integral with each other. The clutch body 50 of the forward travel clutch CLF and the clutch body 50 of the rearward travel clutch CLR are coupled to each other by the coupling portion 50C. The boss portion 50A is externally fitted to the input shaft 23a of the forward/rearward travel switch 23. The clutch body 50 is coupled to the input shaft 23a to rotate integrally therewith by a key 52 configured to engage the boss portion 50A and the input shaft 23a with each other.

The clutch hub 51 has a tubular shape. The clutch hub 51 is disposed inside the clutch plate support section 50B. In the forward travel clutch CLF, a first end portion of the clutch hub 51 in a direction extending along the rotation axis Z is coupled to a forward-travel gear 53 of the forward-travel gear interlocking mechanism 35f, and the clutch hub 51 is supported by the input shaft 23a via the forward-travel gear 53 and bearings 54. In the rearward travel clutch CLR, a second end portion of the clutch hub 51 in the direction extending along the rotation axis Z is coupled to a rearward-travel gear 55 of the rearward-travel gear interlocking mechanism 35r, and the clutch hub 51 is supported by the input shaft 23a via the rearward-travel gear 55 and bearings 56. The clutch hub 51 is supported by the input shaft 23a while being rotatable around the rotation axis Z serving as a rotation center.

First clutch plates 58 defining a plurality of clutch plates arranged in the direction extending along the rotation axis Z are locked to a guide portion 57 included in the clutch plate support section 50B. The plurality of first clutch plates 58 are supported by the clutch plate support section 50B while being rotatable together with the clutch plate support section 50B, and being slidably guided by the guide portion 57.

A plurality of second clutch plates 60 arranged in the direction extending along the rotation axis Z are locked to a guide portion 59 included in the clutch hub 51. The second clutch plates 60 defining a plurality of friction plates are supported by the clutch hub 51 while being rotatable together with the clutch hub 51, and being slidably guided by the guide portion 59.

The clutch body 50 includes, in the interior thereof, a clutch piston 61, return springs 62, and a spring stopper 63.

As shown in FIG. 4, a first support portion 64 configured to be externally fitted to an outer circumferential portion of the clutch piston 61 is provided at a base portion of the clutch plate support section 50B, and a second support portion 65 configured to be internally fitted to an inner circumferential portion of the clutch piston 61 is provided at an end portion of the boss portion 50A. The clutch piston 61 is supported by the first support portion 64 and the second support portion 65 while being slidable from a clutch engaged position at which the first clutch plates 58 and the second clutch plates 60 are pressed, and a clutch disengaged position at which the first clutch plates 58 and the second clutch plates 60 are released. When pressed by the clutch piston 61, the first clutch plates 58 and the second clutch plates 60 are received and supported by a clutch plate stopper 66 included in the clutch plate support section 50B, and the clutch plate stopper 66 is received and supported by a snap ring 67.

The return springs 62 are provided at a plurality of locations in a circumferential direction of the clutch piston 61 in such a manner as to span the clutch piston 61 and the spring stopper 63. In the present example embodiment, as shown in FIG. 4, the spring stopper 63 includes an inserted portion 63a inserted into the interior of the clutch hub 51, and the clutch piston 61 includes a spring housing section 61a. The return springs 62 span the inserted portion 63a and the spring housing section 61a. The return springs 62 press the clutch piston 61 toward the coupling portion 50C, using, as a reaction member, the spring stopper 63 received and supported by the snap ring 68, and returns the clutch piston 61 to the clutch disengaged position at which the first clutch plates 58 and the second clutch plates 60 are released.

In the forward travel clutch CLF and the rearward travel clutch CLR, the clutch body 50 is driven via the input shaft 23a. In response to hydraulic fluid being supplied to an oil chamber 72 from an operational oil passage 70 provided inside the input shaft 23a via a connection oil passage 71 located in the boss portion 50A, the clutch piston 61 is slid using the hydraulic fluid to the clutch engaged position against the return springs 62, the first clutch plates 58 and the second clutch plates 60 are pushed toward the clutch plate stopper 66 by an operation portion 61c of the clutch piston 61, the first clutch plates 58 and the second clutch plates 60 are brought into pressure contact with each other to be coupled to each other by friction, whereby the clutch piston 61 is brought into a clutch engaged state such that power of the clutch body 50 is transmitted to the clutch hub 51 by coupling between the first clutch plates 58 and the second clutch plates 60. In response to the hydraulic fluid being discharged from the oil chamber 72, the clutch piston 61 is slid to the clutch disengaged position by the return springs 62, and the pressing of the first clutch plates 58 and the second clutch plates 60 by the clutch piston 61 is released to decouple the first clutch plates 58 and the second clutch plate 60, whereby the clutch piston 61 is brought into a clutch disengaged state such that the transmission of power from the clutch body 50 to the clutch hub 51 is disabled.

Figure 5:
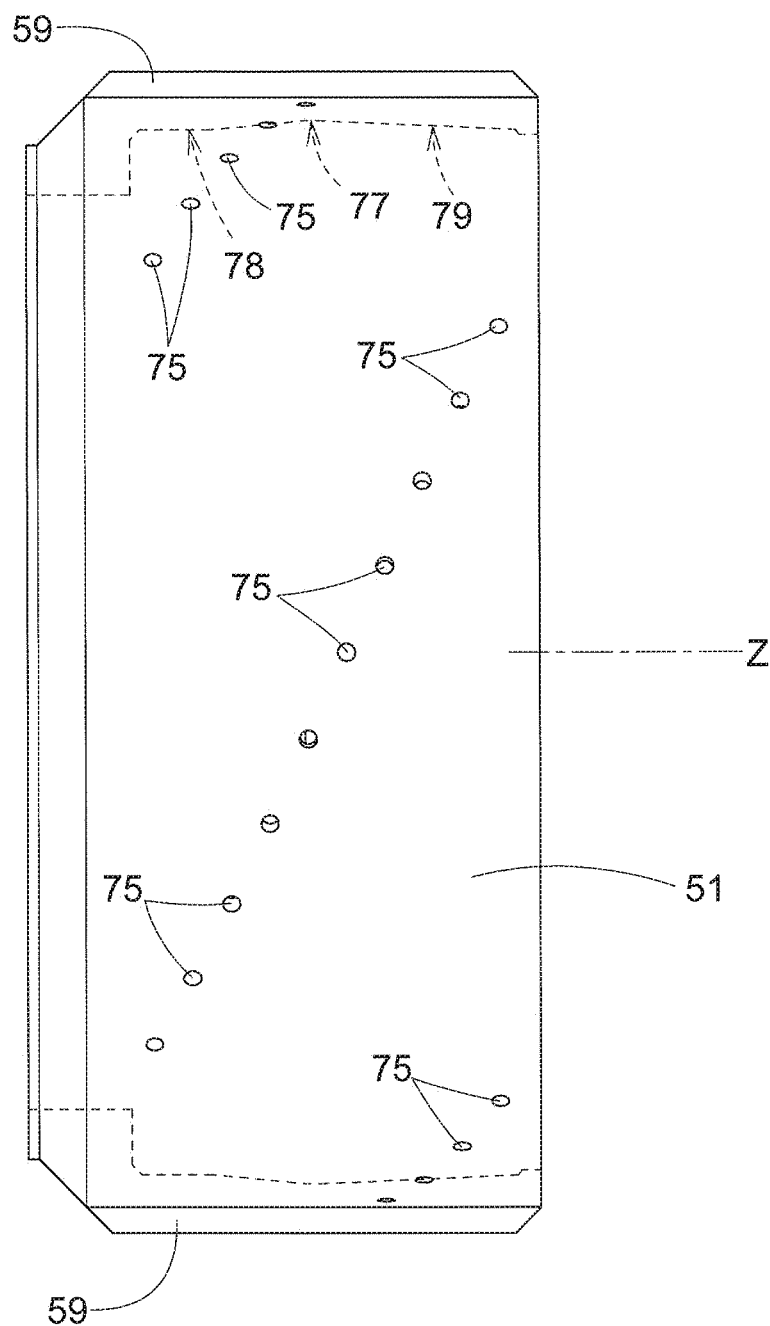
FIG. 5 is a plan view of a clutch hub.

As shown in FIGS. 3 and 4, the clutch hub 51 has oil supply holes 75 extending therethrough and configured to supply lubricating oil from the interior of the clutch hub 51 to the first clutch plates 58 and the second clutch plates 60. As shown in FIG. 5, the oil supply holes 75 are provided at a plurality of locations of the clutch hub 51 in the direction extending along the rotation axis Z. The oil supply holes 75 are arranged with equal intervals therebetween in the circumferential direction of the clutch hub 51 respectively at a plurality of locations in the direction extending along the rotation axis Z. As shown in FIG. 5, the oil supply holes 75 are arranged such that, at adjacent ones of the plurality of locations in the direction extending along the rotation axis Z, an oil supply hole 75 at one of the adjacent locations and an oil supply hole 75 at the other of the adjacent locations are displaced from each other in the circumferential direction of the clutch hub 51. In the present example embodiment, the oil supply holes 75 are provided at ten locations of the clutch hub 51 in the direction extending along the rotation axis Z. However, the oil supply holes 75 may be provided at nine or less locations, or eleven or more locations of the clutch hub 51 in the direction extending along the rotation axis Z. In the present example embodiment, the oil supply holes 75 are provided at four locations arranged at equal or substantially equal intervals in the circumferential direction of the clutch hub 51 at the respective ones of the 10 locations of the clutch hub 51 in the direction extending along the rotation axis Z. However, the oil supply holes 75 may be provided at three or less locations, or five or more locations in the circumferential direction of the clutch hub 51, for example.

As shown in FIGS. 3 and 4, an injection port 76 configured to allow injection of lubricating oil into the interior of the clutch hub 51 is provided in the interior of each clutch hub 51 at an intermediate location between the clutch hub 51 and the rotation axis Z. In the present example embodiment, as shown in FIGS. 3 and 4, the spring stopper 63 includes a piston support portion 63b located between the clutch hub 51 and the coupling portion 50C of the clutch body 50 and configured to slidably support an outer circumferential portion 61b of the clutch piston 61 from inside, and an inserted portion 63a extending from an end portion opposite to an end portion serving to support the outer circumferential portion 61b of the piston support portion 63b, to a side opposite to the side on which the coupling portion 50C is located, and inserted into the interior of the clutch hub 51. The injection port 76 extends through the inserted portion 63a of the spring stopper 63. The injection port 76 can be disposed at a location opposing a portion between opposite end portions of the clutch hub 51 in the direction extending along the rotation axis Z. More specifically, as shown in FIGS. 3 and 4, a longitudinal wall portion 63c extending in the radial direction of the clutch hub 51 is provided at an end portion of the inserted portion 63a on a side opposite to the side on which the piston support portion 63b is located, and the injection port 76 extends through the longitudinal wall portion 63c.

Figure 6:
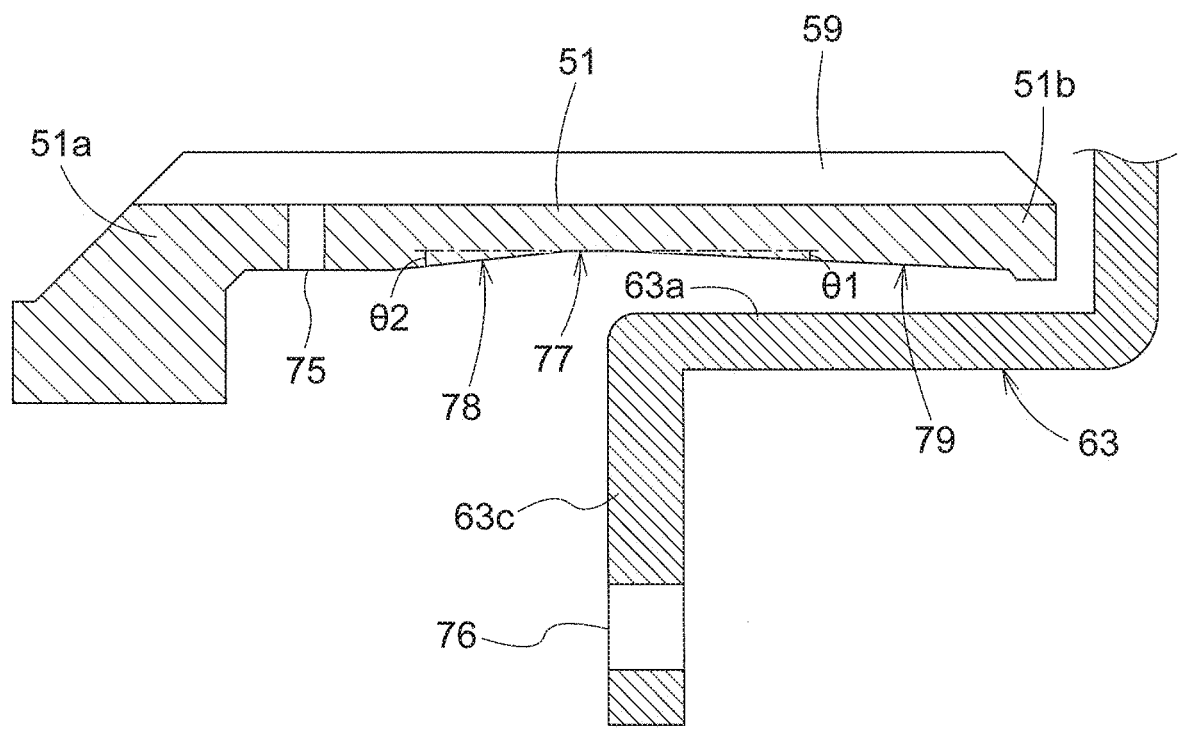
FIG. 6 is a cross-sectional view of the clutch hub.

As shown in FIGS. 4 and 6, the clutch hub 51 has an inner circumferential portion including an opposing portion 77 opposing the injection port 76, the opposing portion 77 being a parallel inner circumferential surface parallel to the rotation axis Z. The inner circumferential portion of the clutch hub 51 further includes a first portion 78 located closer to a first end portion 51a of the clutch hub 51 than the opposing portion 77 is in the direction extending along the rotation axis Z, the first portion 78 being an inclined inner circumferential surface according to which a radius of the clutch hub 51 decreases toward the first end portion 51a. The first end portion 51a is located on one side of the clutch hub 51 in the direction extending along the rotation axis Z. The inner circumferential portion of the clutch hub 51 further includes a second portion 79 located closer to a second end portion 51b of the clutch hub 51 than the opposing portion 77 is in the direction extending along the rotation axis Z, the second portion 79 being an inclined inner circumferential surface according to which a radius of the clutch hub 51 decreases toward the second end portion 51b. The second end portion 51b is located on the other side of the clutch hub 51 in the direction extending along the rotation axis Z. In other words, the second end portion 51b is located opposite to the first end portion 51a in the direction extending along the rotation axis Z of the clutch hub 51.

The second portion 79 has an inclination angle θ1 that is less steep than the inclination angle θ2 of the first portion 78. Accordingly, as compared with the cases where the inclination angle θ1 of the second portion 79 is steeper than the inclination angle θ2 of the first portion 78, and where the inclination angle θ1 of the second portion 79 is the same as the inclination angle θ2 of the first portion 78, the interval between the second portion 79 and the inserted portion 63a of the spring stopper 63 is increased to facilitate entrance of the lubricating oil into the space between the second portion 79 and the inserted portion 63a, and the volume of the space between the second portion 79 and the inserted portion 63a are increased to allow a large amount of lubricating oil to enter the space between the second portion 79 and the inserted portion 63a. In the present example embodiment, the inclination angle θ1 of the second portion 79 is less steep than the inclination angle θ2 of the first portion 78. However, the inclination angle θ1 of the second portion 79 can be steeper than the inclination angle θ2 of the first portion 78, or the inclination angle θ1 of the second portion 79 can be the same as the inclination angle θ2 of the first portion 78.

As shown in FIGS. 3 and 4, the clutch plate support section 50B of the clutch body 50 includes oil discharge holes 80 extending therethrough and configured to discharge lubricating oil out from the interior of the clutch body 50. The oil discharge holes 80 are provided at a plurality of locations of the clutch plate support section 50B in the direction extending along the rotation axis Z. The oil discharge holes 80 are provided at a plurality of portions of the clutch plate support section 50B that are located in the circumferential direction respectively at a plurality of locations of the clutch plate support section 50B in the direction extending along the rotation axis Z. The oil discharge holes 80 may have any shape including, for example, an oval shape, a circular shape, and a rectangular shape. Any number of oil discharge holes 80 may be provided at any location. For example, a large oil discharge hole 80 may be provided at only one location of the clutch plate support section 50B.

As shown in FIGS. 3 and 4, the clutch piston 61, the spring stopper 63, and the boss portion 50A define an oil sump chamber 81 that is in communication with the injection port 76. An oil supply passage 82 is provided inside the input shaft 23a, and a connection oil passage 83 connecting the oil supply passage 82 and the oil sump chamber 81 to each other is defined in the boss portion 50A.

In each of the forward travel clutch CLF and the rearward travel clutch CLR, lubricating oil is supplied to the oil sump chamber 81 from the oil supply passage 82 to the connection oil passage 83, and via a gap between the clutch piston 61 and the boss portion 50A, and the lubricating oil supplied to the oil sump chamber 81 is injected from the injection port 76 into an interior 84 of the clutch hub 51. The injection port 76 is located in the interior 84 of the clutch hub 51 at a location between the clutch hub 51 and the rotation axis Z, thus allowing the lubricating oil to be appropriately injected from the injection port 76 into the interior 84 of the clutch hub 51. The lubricating oil injected into the interior 84 is thrown against an inner circumferential portion of the clutch hub 51 by a centrifugal force generated by rotation of the clutch body 50. The thrown lubricating oil tends to flow from the opposing portion 77 separately to the first portion 78 and the second portion 79. Since the opposing portion 77 is a parallel inner circumferential surface, the momentum of flow of the lubricating oil thrown against the opposing portion 77 to the first portion 78 and the second portion 79 is suppressed as compared with a case where the opposing portion 77 is an inclined inner circumferential surface extending from the inclined inner circumferential surface of the first portion 78 and the inclined inner circumferential surface of the second portion 79. This allows the lubricating oil thrown against the inner circumferential portion to easily flow into the oil supply hole 75. Since the first portion 78 of the inner circumferential portion is an inclined inner circumferential surface, the amount of centrifugal force acting on the lubricating oil decreases toward the first end portion 51a of the inner circumferential portion at the first portion 78. Accordingly, the momentum of flow of the lubricating oil toward the first end portion 51a of the inner circumferential portion is suppressed. Since the second portion 79 of the inner circumferential portion is an inclined inner circumferential surface, the amount of centrifugal force acting on the lubricating oil decreases toward the second end portion 51b of the inner circumferential portion at the second portion 79. Accordingly, the momentum of flow of the lubricating oil toward the second end portion 51b of the inner circumferential portion is suppressed. Since the momentum of flow of the lubricating oil toward the first end portion 51a and the second end portion 51b is suppressed on the inner circumferential portion of the clutch hub 51, the lubricating oil thrown against the inner circumferential portion of the clutch hub 51 can easily flow into the oil supply hole 75. Accordingly, a large amount of lubricating oil is supplied to the first clutch plates 58 and the second clutch plates 60. The oil supply holes 75 are open at a plurality of locations of the clutch hub 51 in the circumferential direction, and a plurality of locations of the clutch hub 51 in the direction extending along the rotation axis Z. Furthermore, the oil supply hole 75 at one of two adjacent locations in the direction extending along the rotation axis Z and the oil supply hole 75 at the other of the two adjacent locations are displaced from each other in the circumferential direction of the clutch hub 51. Accordingly, lubricating oil is supplied over a wide range of portions at which the first clutch plates 58 and the second clutch plate 60 are located. The supply of lubricating oil from the oil supply holes 75 to the first clutch plates 58 and the second clutch plates 60 is carried out while the lubricating oil that has cooled the first clutch plates 58 and the second clutch plates 60 is discharged from the oil discharge holes 80. That is, the lubricating oil that has been appropriately supplied to the interior 84 of the clutch hub 51 can easily flow into the oil supply holes 75, and thus a large amount of lubricating oil is supplied to the first clutch plates 58 and the second clutch plates 60. Furthermore, the lubricating oil is delivered over a wide range of portions at which the first clutch plates 58 and the second clutch plates 60 are located, and thus the first clutch plates 58 and the second clutch plates 60 are efficiently cooled by the lubricating oil.

Alternative Example Embodiments

Although the above-described example embodiments show, as an example, hydraulic clutches used as a forward travel clutch CLF and a rearward travel clutch CLR, example embodiments of the present invention are not limited thereto. It is possible to use a hydraulic clutch used to shift a transmission device.

The above-described example embodiments show examples in which the clutch body 50 is configured to drive, and the clutch hub 51 is configured to be driven. However, the clutch hub 51 may be configured to drive, and the clutch body 50 may be configured to be driven.

The above-described example embodiments show examples in which both the first portion 78 and the second portion 79 form an inclined inner circumferential surface. However, only one of the first portion 78 and the second portion 79 may define an inclined inner circumferential surface. The above-described example embodiments show examples in which the opposing portion 77 is located between opposite end portions of the inner circumferential portion. However, the opposing portion 77 may be located at one opposite end portion of the inner circumferential portion, and only a portion of the inner circumferential portion that is located closer to the first end portion than the opposing portion 77 is may be an inclined inner circumferential surface.

Although the above-described example embodiments shows examples in which the oil discharge holes 80 are provided, the oil discharge holes 80 need not be provided.

The above-described example embodiments show examples in which the oil supply holes 75 are provided at ten locations of the clutch hub 51 in the direction extending along the rotation axis Z. However, the oil supply holes 75 may be provided at nine or less locations, or eleven or more locations in the direction extending along the rotation axis Z, for example.

The above-described example embodiments show examples in which the oil supply holes 75 are provided at four locations of the clutch hub 51 in the circumferential direction. However the oil supply holes 75 may be provided at three or less locations, or five or more locations of the clutch hub 51 in the circumferential direction, for example.

The above-described example embodiments show examples in which the oil supply hole 75 at one of two adjacent locations and the oil supply hole 75 at the other of the two adjacent locations are displaced from each other in the circumferential direction of the clutch hub 51. However, an oil supply hole 75 at one of adjacent locations and an oil supply hole 75 at the other of the adjacent locations may be aligned in the direction extending a long the rotation axis Z, rather than being displaced from each other in the circumferential direction of the clutch hub 51.

Although the above-described example embodiments show examples in which the injection port 76 extends through the spring stopper 63, example embodiments of the present invention are not limited thereto. The injection port 76 may extend through the boss portion 50A or the like.

Although the above-described example embodiments show examples in which the front wheels 1 and the rear wheels 2 are provided, example embodiments of the present invention are. A crawler travel device or a travel device including a combination of wheels and a mini-crawler may be provided as the travel device.

The above-described example embodiments show examples in which the engine 4 is provided. However, the power source is not limited to the engine 4, and an electric motor may be provided as the power source.

Example embodiments of the present: invention are applicable to a hydraulic clutch including a plurality of first clutch plates configured to be locked to a clutch plate support section of a clutch body, and a plurality of second clutch plates configured to be locked to a clutch hub.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A hydraulic clutch comprising:
   a clutch body;
   a tubular clutch hub located inside a tubular clutch plate support section included in the clutch body;
   a plurality of first clutch plates to be locked to the clutch plate support section and arranged in a direction extending along a rotation axis of the clutch body;
   a plurality of second clutch plates to be locked to the clutch hub and arranged in the direction extending along the rotation axis;
   oil supply holes extending through the clutch hub to supply lubricating oil from an interior of the clutch hub toward the first clutch plates and the second clutch plates; and
   an injection port to allow injection of the lubricating oil into the interior of the clutch hub; wherein the injection port is located in the interior of the clutch hub at a location between the clutch hub and the rotation axis; and
   the clutch hub includes an inner circumferential portion including:
   an opposing portion opposing the injection port; and
   a first portion closer to a first end portion of the clutch hub than the opposing portion in the direction extending along the rotation axis, the first portion including an inclined inner circumferential surface structured such that a radius of the clutch hub decreases toward the first end portion;
   the clutch body includes, in the interior thereof:
   a clutch piston to press and release the first clutch plates and the second clutch plates;
   a return spring to return the clutch piston to a release position; and
   a stopper to receive and support the return spring;
   the stopper includes an inserted portion inserted into the interior of the clutch hub;
   the injection port is located in the interior of the clutch hub at a location opposing a portion between opposite end portions of the clutch hub in the direction extending along the rotation axis;
   the inner circumferential portion of the clutch hub further includes a second portion closer to a second end portion of the clutch hub than the opposing portion in the direction extending along the rotation axis, the second portion including an inclined inner circumferential surface structured such that the radius of the clutch hub decreases toward the second end portion;
   the inserted portion is provided at a position opposing the second portion; and
   the second portion has an inclination angle that is less steep than an inclination angle of the first portion.

2. The hydraulic clutch according to claim 1, wherein the opposing portion includes a parallel inner circumferential surface that is parallel or substantially parallel to the rotation axis.

3. The hydraulic clutch according to claim 1, wherein the clutch plate support section includes an oil discharge hole extending therethrough to discharge the lubricating oil out from an interior of the clutch body.

4. The hydraulic clutch according to claim 1, wherein the oil supply holes are arranged with intervals therebetween in a circumferential direction of the clutch hub respectively at a plurality of locations of the clutch hub in the direction extending along the rotation axis.

5. The hydraulic clutch according to claim 4, wherein the oil supply hole at one of two adjacent locations and the oil supply hole at another one of the two adjacent locations are displaced from each other in the circumferential direction of the clutch hub.

6. The hydraulic clutch according to claim 1, wherein the injection port extends through the inserted portion.

7. A work-vehicle travel power transmission apparatus comprising:
- a forward/rearward travel switch including two of the hydraulic clutches according to claim 1; and
- a transmission to shift power supplied from a power source and output the power to the forward/rearward travel switch; wherein
- in response to one of the two hydraulic clutches being engaged, the forward/rearward travel switch is operable to convert power supplied from the transmission into forward travel power and output the forward travel power toward a travel device, and, in response to the other of the two hydraulic clutches being engaged, convert power supplied from the transmission into rearward travel power and output the rearward travel power toward the travel device.

8. A hydraulic clutch comprising:
- a clutch body;
- a tubular clutch hub located inside a tubular clutch plate support section included in the clutch body;
- a plurality of first clutch plates to be locked to the clutch plate support section and arranged in a direction extending along a rotation axis of the clutch body;
- a plurality of second clutch plates to be locked to the clutch hub and arranged in the direction extending along the rotation axis;
- oil supply holes extending through the clutch hub to supply lubricating oil from an interior of the clutch hub toward the first clutch plates and the second clutch plates; and
- an injection port to allow injection of the lubricating oil into the interior of the clutch hub; wherein
- the injection port is located in the interior of the clutch hub at a location between the clutch hub and the rotation axis;
- the clutch hub includes an inner circumferential portion including:
  - an opposing portion opposing the injection port; and
  - a first portion closer to a first end portion of the clutch hub than the opposing portion in the direction extending along the rotation axis, the first portion including an inclined inner circumferential surface structured such that a radius of the clutch hub decreases toward the first end portion;
- the clutch body includes, in the interior thereof:
  - a clutch piston to press and release the first clutch plates and the second clutch plates;
  - a return spring to return the clutch piston to a release position; and
  - a stopper to receive and support the return spring;
- the stopper includes an inserted portion inserted into the interior of the clutch hub; and
- the injection port extends through the inserted portion.

* * * * *